US007716567B1

(12) United States Patent
Retlich

(10) Patent No.: US 7,716,567 B1
(45) Date of Patent: May 11, 2010

(54) MULTILINGUISTIC INDUSTRIAL CONTROL AND MONITORING SYSTEM

(75) Inventor: Kevin Retlich, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2086 days.

(21) Appl. No.: 09/672,935

(22) Filed: Sep. 28, 2000

(51) Int. Cl.
*G06N 3/00* (2006.01)
(52) U.S. Cl. .................................. 715/200
(58) Field of Classification Search ......... 709/224, 709/223; 345/967; 715/526, 527, 536, 500, 715/513, 760, 853, 854, 517, 523, 530, 200, 715/234, 243, 254, 273
See application file for complete search history.

(56) References Cited

U.S. PATENT DOCUMENTS

| | | | |
|---|---|---|---|
| 4,759,123 A | 7/1988 | Ohta et al. ............... 29/832 |
| 4,916,610 A * | 4/1990 | Bapat ................... 717/141 |
| 5,526,268 A * | 6/1996 | Tkacs et al. ............... 704/8 |
| 5,613,115 A | 3/1997 | Gihl et al. .............. 395/701 |
| 5,654,902 A | 8/1997 | Scheidt et al. ....... 364/551.01 |
| 5,708,798 A | 1/1998 | Lynch et al. ............ 395/500 |
| 5,949,335 A | 9/1999 | Maynard ............... 340/572.1 |
| 6,003,012 A | 12/1999 | Nick ..................... 705/10 |
| 6,009,406 A | 12/1999 | Nick ..................... 705/10 |
| 6,044,411 A | 3/2000 | Berglund et al. ............. 710/9 |
| 6,054,987 A | 4/2000 | Richardson ............. 345/348 |
| 6,151,625 A * | 11/2000 | Swales et al. ............ 709/218 |
| 6,167,383 A | 12/2000 | Henson .................. 705/26 |
| 6,180,868 B1 | 1/2001 | Yoshino et al. .......... 136/244 |
| 6,212,491 B1 * | 4/2001 | Bargh et al. ............... 703/14 |
| 6,246,919 B1 | 6/2001 | Hassel .................. 700/116 |
| 6,262,550 B1 | 7/2001 | Kliman et al. ........... 318/565 |
| 6,466,836 B1 | 10/2002 | Astarabadi .............. 700/115 |
| 6,496,945 B2 | 12/2002 | Cepulis et al. ............ 714/25 |

FOREIGN PATENT DOCUMENTS

EP  0 088 591 A2  9/1983
WO  WO 99/16073  4/1999

OTHER PUBLICATIONS

U.S. Appl. No. 09/670,925, filed Sep. 28, 2000, Retlich et al.

(Continued)

*Primary Examiner*—Kyle R Stork
(74) *Attorney, Agent, or Firm*—Fletcher Yoder LLP; Alexander R. Kuszewski; John M. Miller

(57) ABSTRACT

A control and monitoring system is adapted to collect parameter data from networked devices, and to display representations of the system or monitored data in a number of selectable languages on a monitoring station. Textual labels for the representations are stored in a system database. Component and system data may also be stored in the database for use in identifying and monitoring the components. The language used for the labels is selectable by a user via a menu, and the corresponding entries in the database are used in building the representations. The language may thus be changed in real time without interrupting the monitoring and control functions of the components or the monitoring station.

28 Claims, 12 Drawing Sheets

OTHER PUBLICATIONS

U.S. Appl. No. 09/672,931, filed Sep. 28, 2000, Krueger et al.
U.S. Appl. No. 09/672,933, filed Sep. 28, 2000, Jensen et al.
U.S. Appl. No. 09/672,934, filed Sep. 28, 2000, Hadfield et al.
U.S. Appl. No. 09/672,936, filed Sep. 28, 2000, Caspers et al.
U.S. Appl. No. 09/672,937, filed Sep. 28, 2000, Retlich et al.
U.S. Appl. No. 09/675,236, filed Sep. 29, 2000, Heberlein et al.
U.S. Appl. No. 09/675,451, filed Sep. 29, 2000, Retlich et al.
U.S. Appl. No. 09/675,866, filed Sep. 29, 2000, Jung-Siang Hu et al.

* cited by examiner

FIG. 11

| DNETDEVICE | NODE | VERT SECTION | UNIT LOC | SPACE FACTORS | UNIT TYPE | IN... | WIDTH | RATING | CATALOG NUMBER |
|---|---|---|---|---|---|---|---|---|---|
| DSA | 07 | 2 | E | 1 | FVNR | | 20 | 10HP | XXXXX |
| DSA | 06 | 2 | G | 1.5 | FVR | | 20 | 2HP | XXXXXXXXXX |
| DSA | 05 | 2 | K | 1 | FVNR | | 20 | 15HP | XXXXXXXXXX |
| NONE | 27 | 2 | M | 0.5 | DOOR | | 20 | | |
| 1336IMPACT | | 3 | A | 1 | ACD | | 20 | 400A | |
| NONE | 09 | 3 | F | 1 | DOOR | | 20 | | |
| DSA | | 3 | H | 2 | FVNR | | | | |
| DSA | | 4 | A | 1 | FVNR | | | | |
| ... | ... | ... | ... | ... | ... | | | | |

SYSTEM 1 SPREADSHEET VIEW
SELECT SORT — NONE
○ ASCENDING  ○ DESCENDING
SELECT FILTER — NONE  ⊙ NONE

SHOW /& HIDE COLUMNS

| COLUMN NAME | |
|---|---|
| DNET DEVICE | ☑ |
| STATE | ☐ |
| NODE | ☑ |
| SERIAL NUMBER | ☐ |
| VERT SECTION | ☑ |
| UNIT LOC | ☑ |
| SPACE FACTORS | ☐ |
| DUAL UNIT | ☐ |
| LEFT / RIGHT | |

[ OK ]  [ CANCEL ]

[ SHOW / HIDE COLUMNS... ]   [ EDIT I/O... ]

FIG. 12

| EVENT LOG | | | DOCUMENTATION | | | |
|---|---|---|---|---|---|---|
| SYSTEM 1 ▼ | | | ▼ DRAWINGS | | | |

SYSTEM 1 SPREADSHEET VIEW

SELECT SORT
NONE ▼   ○ DESCENDING    REPORTS  MANUALS  SPARE PARTS    ⊙ NONE
○ ASCENDING

| DEVICE SERIAL... | DATE | SECTION | LOCATION | DESCRIPTION | DEVICE TYPE | USER 1 | USER 2 | USER 3 |
|---|---|---|---|---|---|---|---|---|
| 1074397223 | 06/16/2000 14:12:54 | 3 | A | SERIAL NO. CHANGE ON DEVICENET... | 1336PLUSII | | | |
| 1074397223 | 06/22/2000 11:03:26 | 3 | A | SERIAL NO. CHANGE ON DEVICENET... | 1336PLUSII | | | |
| 1074397223 | 06/23/2000 15:32:47 | 3 | A | NO COMMUNICATION | 1336PLUSII | | | |
| 1074397223 | . | 3 | A | NO COMMUNICATION | . | | | |
| 1074397223 | . | 3 | A | FAULT | . | | | |
| | . | . | . | . | . | | | |
| | . | . | . | . | . | | | |

SHOW/HIDE COLUMNS...

MULTILINGUISTIC INDUSTRIAL CONTROL AND MONITORING SYSTEM

BACKGROUND OF THE INVENTION

The present invention relates generally to the field of control and monitoring systems, such as systems employed in industrial automation applications. The invention relates more particularly to a technique for allowing representations or presentations of monitored or controlled devices and systems in a variety of languages which are selected and displayed in real time along with the monitored or controlled parameter data.

A wide variety of systems are available for control and monitoring functions, particularly in industrial settings. Such systems may include components which regulate the application of electrical power to loads, such electric motors. In a motor control center, for example, circuit protection devices, component protection devices, drives, starters, relays, disconnects, and so forth are interconnected to carryout desired industrial processes. The processes may be defined by pre-established routines, and may rely upon sensed parameters and operator-induced command inputs, all of which are transmitted through a data network.

Limited integration of automated control and monitoring has been provided in systems of this type. In many applications, no overall system monitoring functions are available. Where limited system monitoring is offered, specialized software is often provided which is adapted for the specific installation of the system. Even where relatively standard software can be employed for automated systems, textual labels, explanatory notes, and the like are most often provided in a single language, with the software itself being offered in specific, individualized and discrete products for specific language markets.

There is need, however, for a technique which would facilitate adaptation of control and monitoring system software for a variety of languages. There is a particular need, at present, for a technique which would allow the same software package to be sold and used in different language markets without the need to specifically adapt the software for those markets. There is also a need for a technique which would allow control or monitoring software to display system data in any of a variety of languages, and to change the display language in real time without reloading the software or maintaining several different language software packages.

SUMMARY OF THE INVENTION

The invention provides a novel approach to multilinguistic control and monitoring software designed to respond to these needs. The technique may be applied in a wide range of settings, and is well suited to systems in which similar software may be useful over a variety of systems, and linguistic markets. The technique is particularly well suited to industrial automation systems, wherein similar software and monitoring functions may be needed in various locations, and real time changes in the language may be useful for operators with various language backgrounds.

The technique makes use of a system database which stores text for display in user viewable representations of the system, components, and monitored parameters. The same or a related database preferably also stores system information, including components settings, component configuration data, network addresses, and so forth. A user of the system may select a desired language, and textual labels in the representations are drawn from the database in accordance with the selected language. The textual labels are applied to the representations, along with parameter data, component data, system data, and so forth, which can be updated in real time. Changes in the language selected from the database can be made without interrupting system utilization, monitoring functions, control functions, or the software settings in any other way. The software may thus be updated by adding translations to appropriate fields and entries of the database. Similar textual descriptions of components, catalog data, and so forth may also be provided to permit a fully translated version of the user interface in real time and without perturbation to the system operations.

BRIEF DESCRIPTION OF THE DRAWINGS

The foregoing and other advantages of the invention will become apparent upon reading the following detailed description and upon reference to the drawings in which:

FIG. 11 is a spreadsheet view for component operating parameters and settings accessible from the physical view of FIG. 8;

FIG. 12 is a view of event logs viewable on a monitoring station and illustrating links to drawings, reports, manuals and spare parts lists in an integrated documentation system;

DETAILED DESCRIPTION OF SPECIFIC EMBODIMENTS

Figure 1:
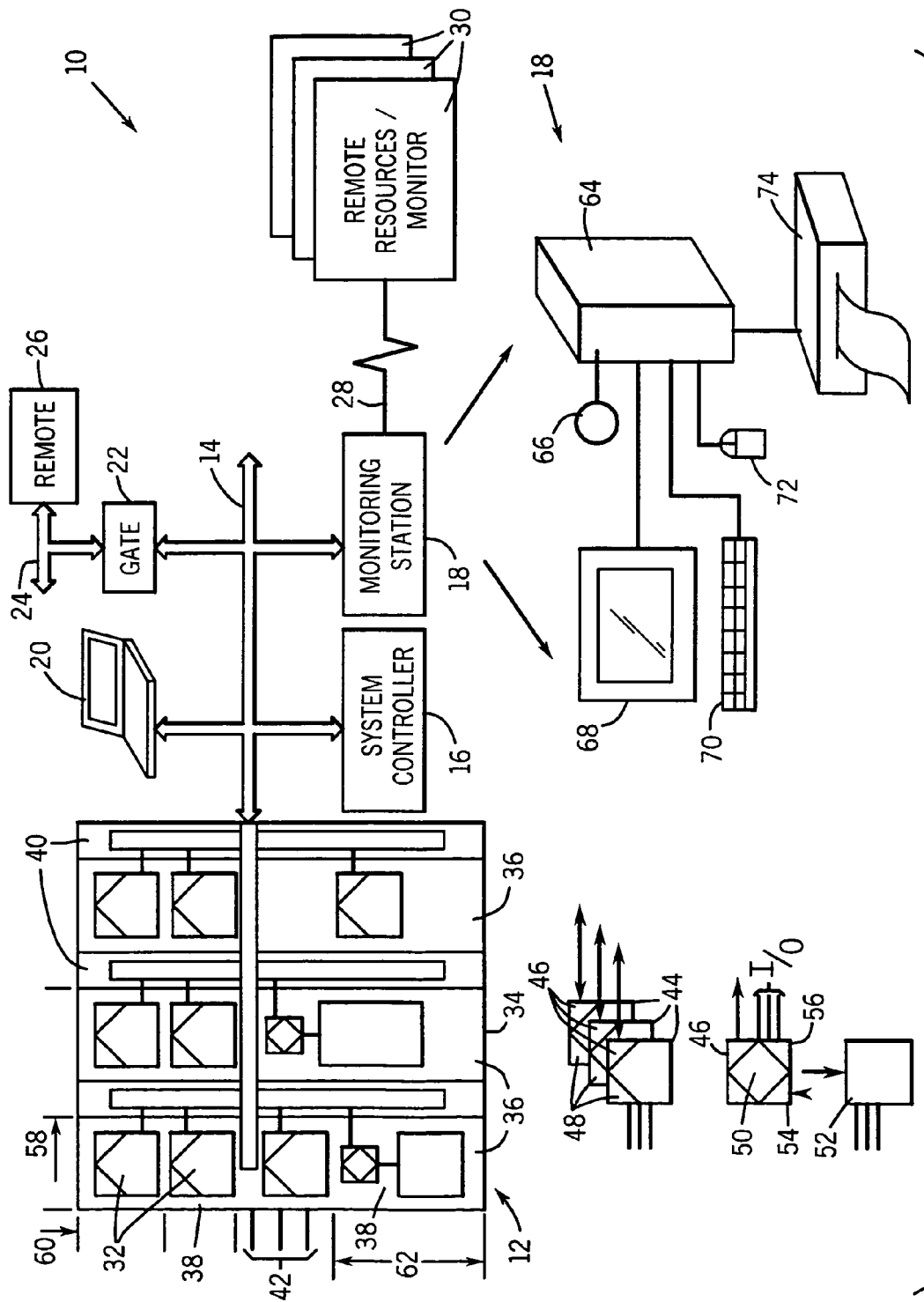
FIG. 1 is a diagrammatical representation of an electrical control and monitoring system including networked programmable components and monitoring stations, remote resources, and additional network components in accordance with aspects of the present technique.

Turning now to the drawings, and referring first to FIG. 1, a control and monitoring system 10 is illustrated as including a component assembly 12, and a network 14 for transmitting data to and from components of the assembly. While the component assembly 12 may take many forms, and include devices for accomplishing many different and varied purposes, in a preferred implementation, the component assembly includes electrical control and monitoring equipment for regulating application of electrical power to loads. In particular, the components may include motor starters, motor controllers, variable frequency drives, relays, protective devices such as circuit breakers, programmable logic controllers, and so forth. In the industrial automation field, such component assemblies are commonly referred to as motor control centers (MCC's).

In addition to the component assembly and network, system 10 includes a system controller 16 and a monitoring station 18. System controller 16 may, in fact, be defined by various devices both within and external to the component assembly, and may comprise computer systems connected to the component assembly via network 14. Where included in the system, system controller 16 may store programs, routines, control logic, and the like for regulating operation of the components of the system. Monitoring station 18, described in greater detail below, may be local to or separate from system controller 16. The monitoring station permits operational status and parameters to be monitored in real time, and affords programming of certain of the components of assembly 12. It should be noted that while a single assembly 12 is illustrated in the figures and described herein, the component assembly 12 may, in fact, include a range of assemblies, each located near one another or remote from one another in a particular application, interconnected with controller 16 and monitoring station 18 via network 14.

Network 14 may also permit data exchange with additional monitoring and control stations. For example, in the illustrated embodiment, a field engineer laptop 20 may be coupled to network 14 to produce representations of the system, monitor parameters sensed or controlled by the system, program components of the system, and so forth. Similarly, one or more gateways 22 may be provided which link network 14 to other networks 24. Such networks may use a similar or completely different protocol from that of network 14. The other networks 24 may include various remote devices, as indicated generally by reference numeral 26, which permit remote monitoring and control of components of the system. One or more of the control or monitoring stations in the system may be adapted to be linked to outside elements by wide area networks, as represented generally at reference numeral 28, including the Internet. Thus, monitoring station 18 may access remote resources and monitoring equipment 30 via wide area network 28, as described more fully below.

It should be noted that, while reference is made herein to a wide area network 28, other network strategies may be implemented in the system, including virtual private networks, dedicated communications links, and so forth. While any suitable network 14 may be used in the system, in a present embodiment, an industry standard network is employed, referred to commonly under the name DeviceNet. Such networks permit the exchange of data in accordance with a predefined protocol, and may provide power for operation of networked elements.

Component assembly 12 comprises a range of components, designated generally by reference numeral 32. The components are situated in an enclosure set 34 which may include a single or a plurality of separate enclosures. The enclosure set 34, in the illustrated embodiment, includes sections 36 in which subunits or sub-assemblies of the component assembly are situated. In practice, the enclosure set may be defined by a large enclosure in which individual panel-mounted subunits are positioned in bays 38. Between each of the sections or bays, wireways 40 serve to channel wiring, including trunk and drop cabling for network 14. As will be appreciated by those skilled in the art, one or more power busses 42 serve to convey electrical power to the enclosure, which is routed to each of the components to regulate the application of the power to downstream loads, such as electric motors, valves, actuators, and so forth.

Components 32 generally include both an operative device, designated generally by the numeral 44, along with network interface circuitry 46, and load-line interface circuitry 48. While reference is made herein, generically, to a component device 44, it should be noted that in an industrial automation context, such devices may include any or all of the power regulation devices mentioned above, as well as others. In general, the devices may serve to regulate any useful industrial process or load, and may be configured to function in cooperation with one another, such as to protect the other components from overcurrent conditions, loss of phase, ground fault, or any other abnormal or unwanted condition. In normal operation, the devices function in accordance with a predetermined routine or program, either stored within the devices themselves, in memory of a programmable logic controller, or in memory of a system controller 16. Moreover, operation of the devices may be regulated in accordance with parameters sensed by the components themselves, or by system sensors. Finally, operation of the devices may be regulated by operator-induced command inputs, including inputs made via a computer interface, push buttons, switches, or in any other suitable manner.

The components may be configured for direct connection to the data network 14, or may require connection to the network a translator 50. In the illustrated embodiment to FIG. 1, translator 50 serves to communicate data to and from a downstream device 52 which is not equipped for directly receiving and transmitting data via the network. As noted below, the components preferably include dedicated memory objects which facilitate certain of the monitoring and control functions of the system. Where a downstream device 52 does not include such objects, or is not equipped for data communications in accordance with the network protocol, a translator 50 may, instead, include the necessary memory objects, and serve to take on the identity of the downstream object from the point of view of the data network, translating data from the device in accordance with a second protocol as defined by the device, such as a CAN protocol known as SCANport in a present embodiment. In such cases, the translator 50 includes a device interface 54 which communicates with the downstream device 52 in accordance with the second protocol. Translator 50 may further include input/output interface circuitry 54 for transmitting and receiving information with other devices of the system. While not illustrated in FIG. 1, certain of the components 32 may include similar input and output interface circuitry, permitting them to similarly exchange information with external devices of the system.

When positioned in the enclosure set 34, the components, devices, translators, and other elements of the system, may be represented as having specific locations or coordinates 58 and 60. In the illustrated embodiment, coordinate 58 represents a horizontal location of the components from a left-hand side of the enclosure set. Coordinate 60, on the other hand, represents the location of the components from a top side of the enclosure set. As noted below in greater detail, memory objects of each component or translator may store data representative of these coordinates to facilitate their location in the system, as well as to enhance certain of the monitoring and display functions of the system. In addition to coordinates 58 and 60, the components may include physical extent designations, such as size or space factors, designated generally by reference numeral 62, corresponding to the relative extent of a component or a subassembly within the enclosure set. As will be appreciated by those skilled in the art, coordinates 58 and 60, and factors 62 may permit the components to be accurately located and depicted in the system as described below.

Monitoring station 18 includes a computer console 64 in which various types of memory supports 66 may be employed, such as magnetic or optical memory devices (e.g., CD ROM's). The computer console 64 is adapted to cooperate with peripheral devices, such as conventional computer monitor 68, and input devices such as a keyboard 70 and mouse 72. Moreover, the console 64 may cooperate with additional peripheral devices, such as a printer 74 for producing hard-copy reports.

Figure 2:
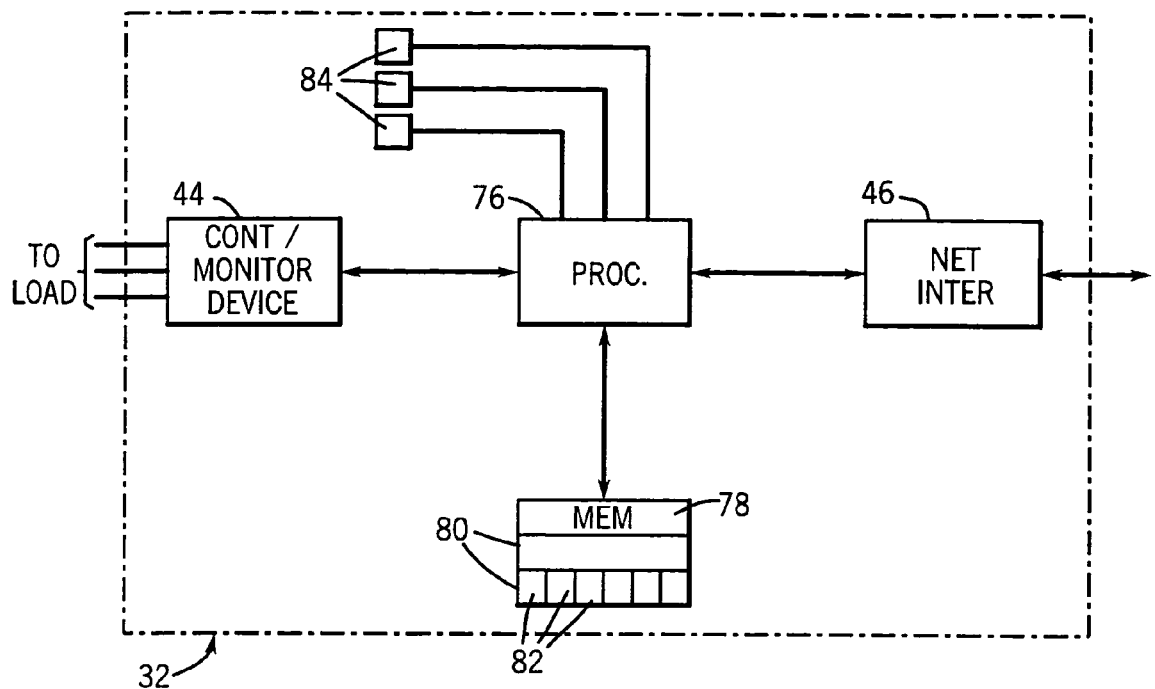
FIG. 2 is a diagrammatical representation of certain functional circuitry within a networked component in a system such as that shown in FIG. 1.

Certain of the functional circuitry contained within each component 32 is illustrated in FIG. 2. As noted above, each component 32 will include a control or monitoring device 44, such as a conventional device for regulating application of electrical power to a load. The devices, when adapted to regulate power in this way, may include single or multi-phase arrangements, and may operate on mechanical, electro-mechanical or solid state principles. A network interface circuit 46 permits the exchange of data between the component and other devices coupled to network 14 (see FIG. 1). Network interface 46 will be adapted to encode data in accordance with the protocol of the network, such as the DeviceNet protocol mentioned above. The components further include a processor 76 which communicates with the control and monitoring device 44 and the network interface 46 to control operation of the component, and to provide access to and exchange of data representative of states, parameter levels, and so forth, controlled by or monitored by device 44. Processor 76 is associated with a memory circuit 78, which will typically include a solid state, resident, non-volatile memory which is embedded and maintained on-board the component 32.

As discussed more fully below, memory circuit 78 includes one or more dedicated objects 80 which are allocated for specific data representative of the system, the component, the component function, the component location, and so forth. Thus, memory objects 80 include sectors or blocks 82, typically each comprising a plurality of bits, for storing code representative of the designated data. Processor 76 may also receive inputs from sensors 84 which are external to device 44. Both device 44 and sensors 84 may serve to sense any suitable operational parameters, such as current, voltage, frequency, speeds, temperatures, and so forth.

Figure 3:
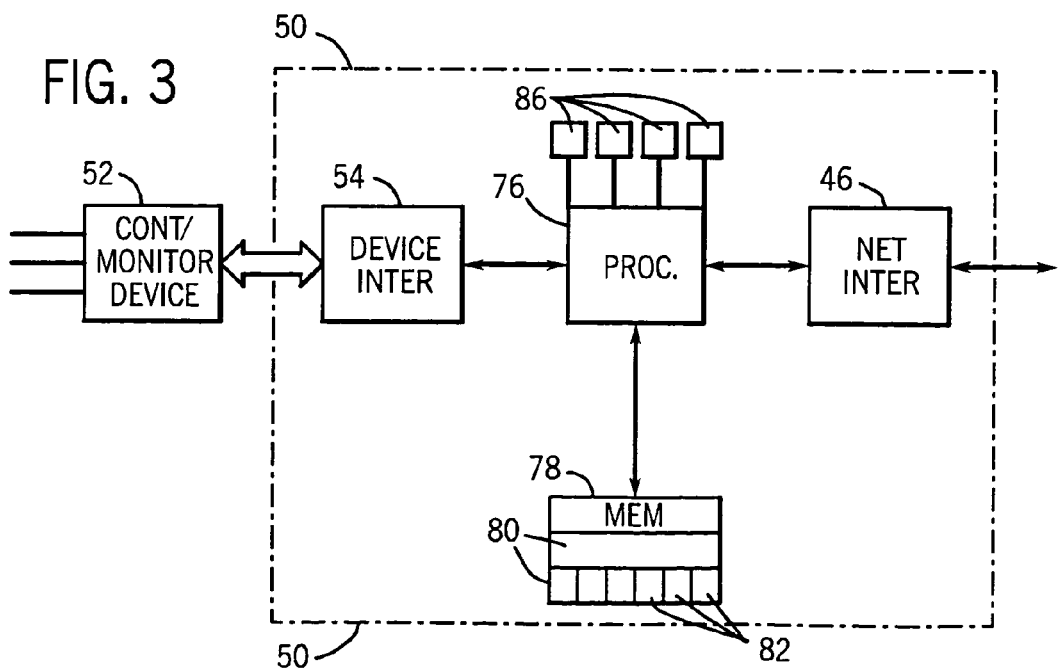
FIG. 3 is a diagrammatical representation of components of a translator module for use with non-networkable or non-programmable, components in a system such as that shown in FIG. 1.

Similar functional circuitry is included within each translator 50, as illustrated generally in FIG. 3. As with components 32 (see FIG. 1), translators 50 include a processor 76 which cooperates with a network interface circuit 46 to exchange data between the translator and other elements of the system. Processor 76 also operates in conjunction with a device interface 54 which is adapted to exchange data between the translator and a control or monitoring device 52, which is either not programmable as desired in the network or networkable in accordance with the protocol of network 14 (see FIG. 1). Moreover, processor 76 is linked to a memory circuit 78 which stores routines carried out by the processor, as well as dedicated memory objects 80 as described above. Finally, translators 50 may include one or more input/output nodes or terminals 86 for exchanging data with other elements or devices (not shown) and the network. By way of example, input/output nodes 86 may permit linking of the network to various sensors, actuators, and the like. Where desired, as in a present embodiment, translators may accommodate inputs only, or neither inputs nor outputs. Moreover, in a presently preferred embodiment, DIP switches (not shown), allow for selection of one of multiple operating voltages for the translator 50, including 24 VDC, 115 VAC and 230 VAC.

Figure 4:
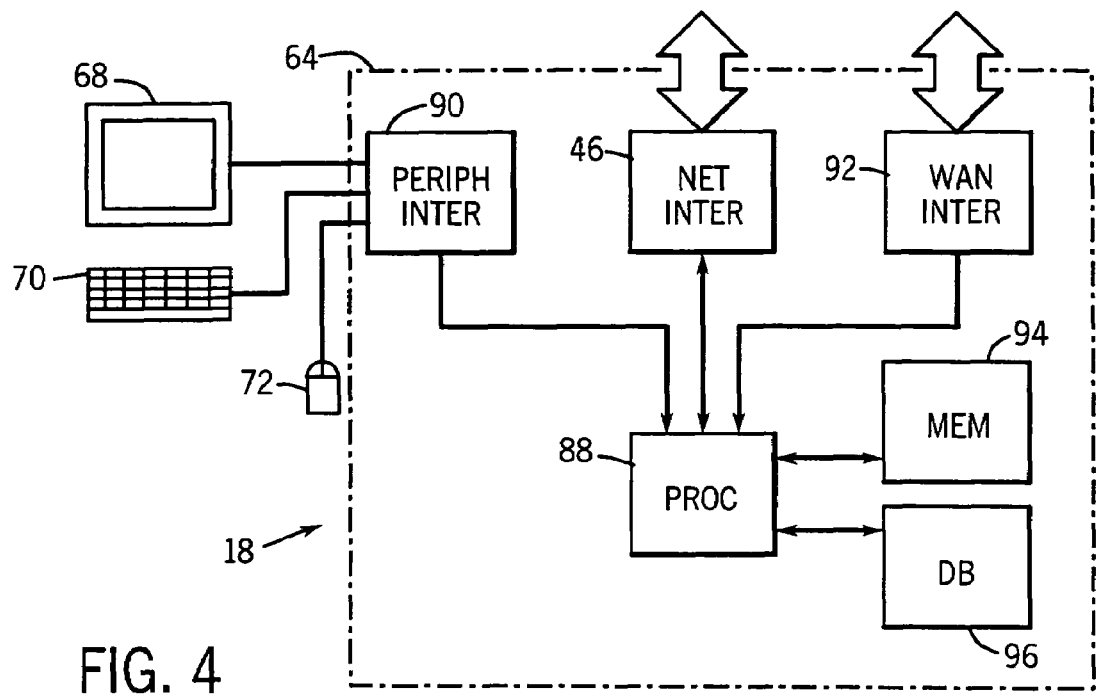
FIG. 4 is a diagrammatical representation of functional elements included in a monitoring station designed to access data from components in a system such as that shown in FIG. 1 and to display data relating to component status and operating parameters.

Monitoring station 18 may include, as a software platform, any suitable processor or computer workstation. As illustrated in FIG. 4, the computer 64 includes a processor 88, such as a Pentium III processor available from Intel. Processor 88 carries out instructions and manages collection and display of operational parameters in the form of user viewable representations as described below. The processor thus communicates with a network interface 46 in a manner similar to the interfaces included within each component, linking the monitoring station to network 14 (see FIG. 1). Moreover, processor 88 communicates with its associated peripheral devices via a peripheral interface 90. A wide area network interface 92 is included within the monitoring station, and may include any suitable network circuitry, including a dial-up modem, a cable modem, a wireless modem or other network circuit. A memory circuit 94 is provided within computer 64, and may include a range of memory devices, such as solid state memory chips, magnetic disk drives, hard drives, and CD ROM drives.

Figure 5:
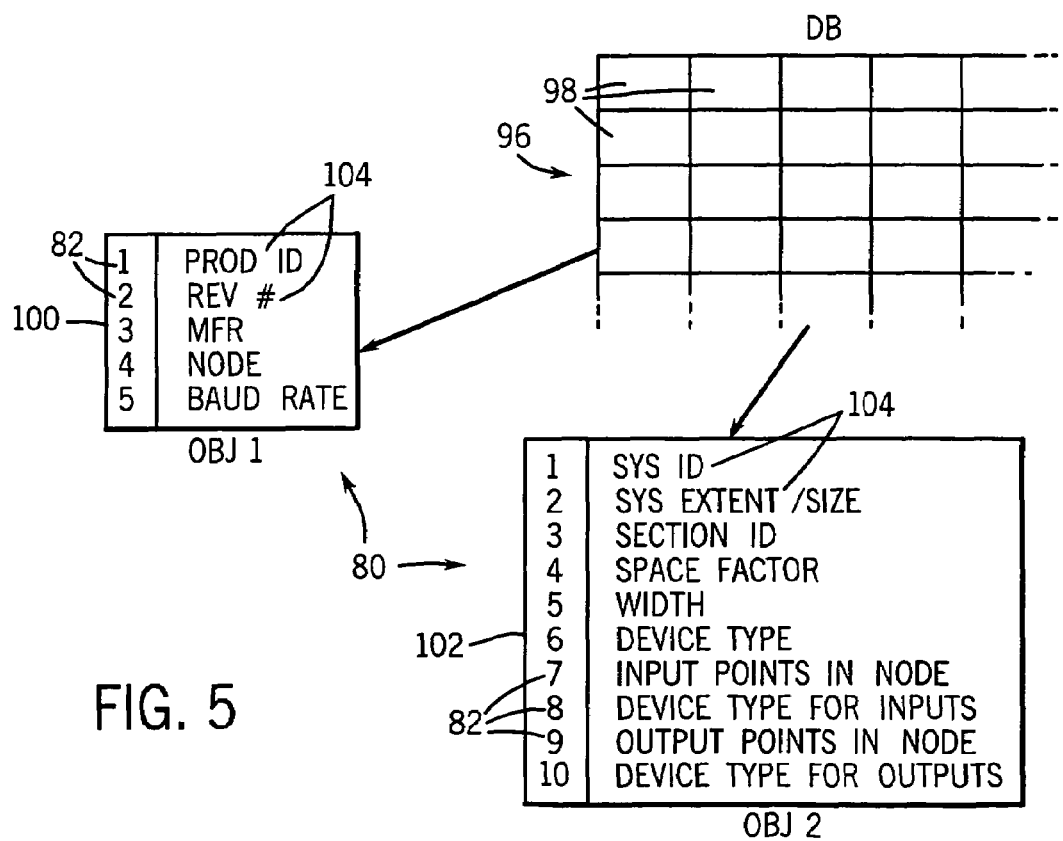
FIG. 5 is a diagrammatical representation of certain dedicated memory objects included in programmable components of the system of FIG. 1 for storing portions of a database distributed among the components and including data for designating the system, the components, and so forth.

Referring to FIG. 5, a database 96 is stored within computer 64, and, in practice, may be included within one or more of the memory circuits 94. Due to the nature of the database and its functions in the system, however, separate reference is made herein to the database and the information contained therein. As noted below, processor 88 relies upon database 96 for many of the control or monitoring functions, including communication with the system components, programming or reprogramming of the system components, generation of user viewable representations of the system, and so forth.

Database 96 serves as the foundation for programming of memory objects within the components and translators of the system. In a present embodiment, the database is established during system design, but may be modified subsequently depending upon system requirements and system redesigns. The database includes entries 98 designating the system, the components in the system, physical and configuration parameters of the components, textual labels for user viewable representations, system settings, events, and so forth as described in greater detail below. The database also serves as the source for data stored within the memory objects of each component and translator.

As illustrated in FIG. 5, at least two such objects are preferably included within the components and translators. A first object 100 is configured at the time of manufacturing of the component, or subsequent to manufacturing and during installation of the component in the final system. Such memory objects will preferably include blocks 82 allocated by specific bits for encoding data 104 representative of the component identification. As illustrated in FIG. 5, the block data 104 of object 100 preferably includes code identifying the product itself, the revision number of the product, if any, a manufacturer of the product, a network node designation, and a data exchange baud rate. Again, the code needed to populate each of the allocated blocks 82 may be stored within database 96 and may be altered as needed. In a present embodiment, data downloaded into the components is derived from database 96 by reformatting the data to conform to the allocated blocks 82.

A second memory object 102 stores additional data derived from database 96. Such data remains resident within each component or translator following system assembly. The block data 104 of memory object 102 includes code which identifies or designates the system, the components, and physical location or configuration information for the components. Moreover, object 102 preferably includes allocated memory for configuration of input or output nodes coupled to the network via the component. In the illustrated embodiment, object 102 includes code representative of a system identification, a system extent or size, the identification of a section within which the component is located, a size or space factor, a width factor, a device type, a number of input points within the node, a device type for each of the input points, if any, a number of output points in the node, and designations for device types of any outputs, if any. It should be noted that certain components or translators may accommodate inputs only, outputs only, or neither inputs nor outputs.

In general terms, the system identification code and system extent or size code is representative of the system in which the components are located. Because many applications may include several such systems, this data aids in monitoring and viewing component information by individual system. The section identifications, space factor and width information, generally corresponding to the coordinates 58 and 60, and to the size factor 62 discussed above with reference to FIG. 1, aid in locating the components within the system for physical layout representations as described below. The device type information may include data representative of the physical or wiring configuration of the components, such as code representative of full voltage, non-reversing motor starter, three-phase overload relay, and so forth, by way of example. Finally, the input and output configuration fields are provided in sets, in accordance with the number of inputs and outputs interfaced at the node.

Figure 6:
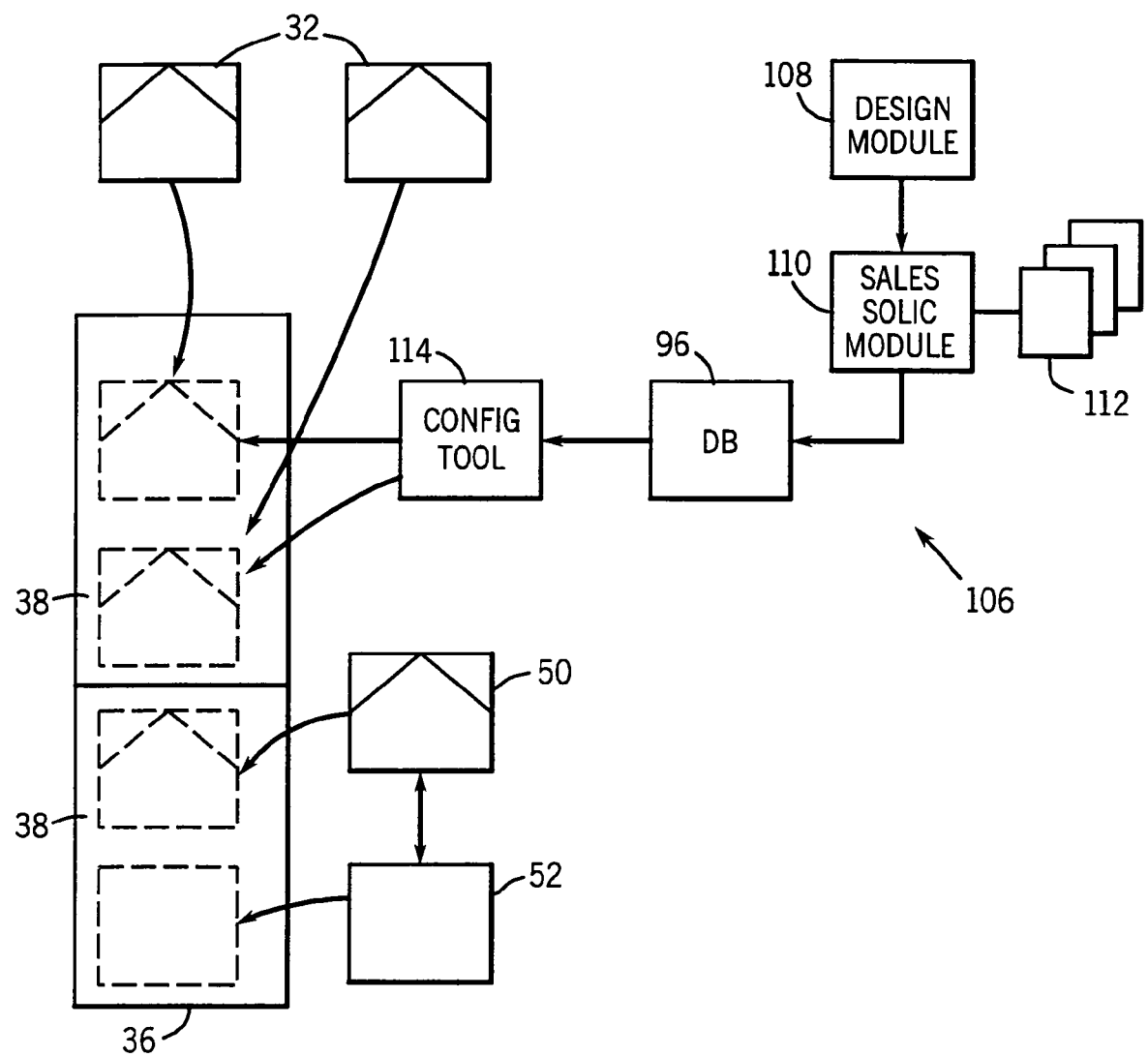
FIG. 6 is a diagrammatical representation of functional components in an integrated design, sales, and programming arrangement for implementing a distributed database in a system such as that illustrated in FIG. 1.

As noted above, data which populates each dedicated memory object of the components or translators is preferably stored in the objects during initial configuration, but may be modified subsequent thereto. In accordance with certain aspects of the present technique, an integrated design, sales, and manufacturing system permits the database 96 to be used for a number of purposes throughout the life of the system, from its initial design to its final implementation. FIG. 6 represents functional blocks in a configuration system 106 designed for this purpose.

As illustrated in FIG. 6, individual components 32 are designed into the system, and are intended for location within specific sections 36 and bays 38 of the enclosure set. The sections and bays may include translators 50 and their associated downstream devices 52, particularly where the downstream devices are not designed to interface with the system data network, or where the downstream devices do not include the dedicated memory objects described above. The configuration system 106 includes a design module 108 which may comprise software and hardware for developing an initial system design. The design module 108, for example, will typically include one or more computer workstations on which software is provided for producing system layouts and configuration information. The design module accesses additional information, such as pricing information, availability information, configuration data, serial numbers, model numbers, and the like, for generation of database 96. Based upon database 96, a sales solicitation module 110 uses the same database data entries for generation of a sales solicitation proposal 112. In general, proposal 112 will be a textual document (including, where desired, diagrams, schematics and so forth), which sets forth specifications for the components defined in database 96, as well as their implementation within the system. The sales proposal 112 may also include information relating to delivery times, programming, pricing, and so forth.

In accordance with the present technique, the database established in accordance with the design set forth by the design module 108, and used by the sales solicitation module 110 for generating proposal 112 then serves to configure the actual objects contained within the components and translators of the system. A configuration tool 114, referred to in the system as a "configurator," serves to extract data from the database needed to populate each dedicated memory object of the components. As summarized below, the configurator may be linked to the components prior to their assembly in the system, or during their mounting within the individual sections or bays which are subsequently placed within the enclosure set. Thus, the configurator may be linked to the components via a temporary network link to address the memory locations of the objects, and to download the corresponding entries from database 96 into the objects. Alternatively, the configurator may be linked to the components following partial or final assembly of the system, such as through the data network 14 discussed above.

Figure 7:
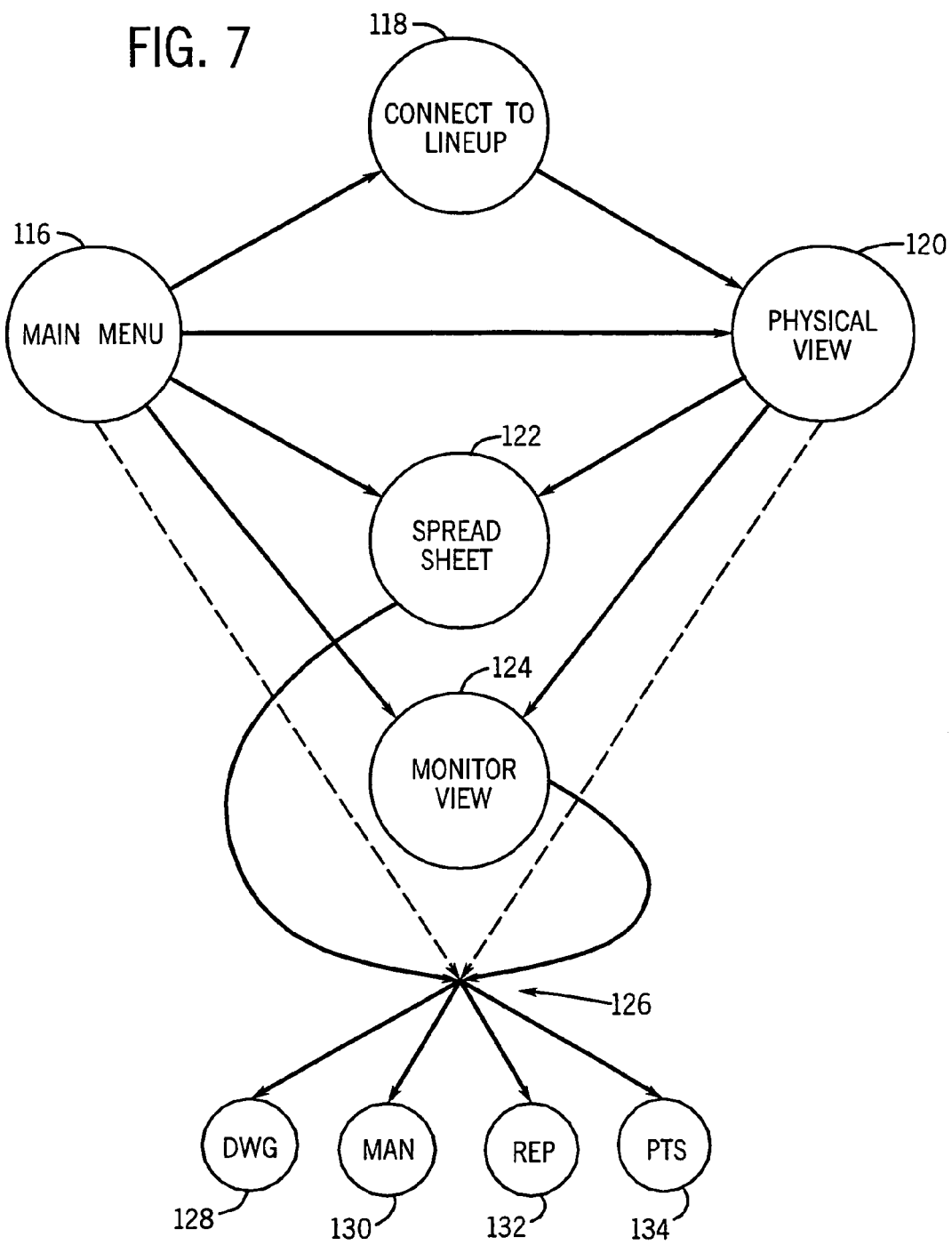
FIG. 7 is a diagram illustrating links between user viewable pages or representations in a monitoring station linked to a control and monitoring system.

The processor of monitoring station 18 (see FIG. 1) executes software for cyclically polling the components of the system via network 14. The software also serves as the basis for generating a series of user viewable representations or screens depicting the system, component configuration information, monitored parameter levels, and so forth. FIG. 7 represents the association of various views available to a user in accordance with a present embodiment of the routine. The routine illustrated in FIG. 7 includes a main menu 116 from which a variety of representations may be accessed. For example, from main menu 116 a user may connect directly to the line-up or component assembly 12 illustrated in FIG. 1, as indicated at reference numeral 118 in FIG. 7. From the main menu or from the lineup connection link, a physical view may be selected as indicated at reference numeral 120. As described more fully below, the physical view provides a dimensionally and dispositionally approximate layout the system and components reconstructed from data acquired from the various components and translators. A spreadsheet view 122 may be selected from either the main menu or the physical view 120. The spreadsheet view, as described below, includes data entries, again drawn from database 96 (see FIG. 6), representative of the components, their identifications, their settings, their locations, and so forth. A monitor view 124 is provided for each component or device. The monitor view, also described below, provides for descriptions of the components, and may include images of the components, as well as graphical displays of current and historical parameter levels.

In addition to the menus and views summarized above, the software operative on the monitoring station also preferably affords easy access to a variety of support documentation, from a node point in FIG. 7 represented by reference numeral 126. The support documentation may include electronic files stored at the monitoring station, in resident memory of the monitoring station or in any memory medium (e.g., CD ROM) usable at the monitoring station, but may also include data files stored remote from monitoring station, such as at remote resources as discussed above with FIG. 1. In a present embodiment, a wide range of support documentation may be accessed directly from the user viewable representations. For example, the data files may include system or component drawings 128, manuals 130, reports 132, and parts lists or breakdowns 134. The support documentation is preferably referenced at the creation of the system, such as through database 96 as discussed above. Thereafter, the documentation is stored for ready access via software links through the views accessible on the monitoring station. Thus, the data files for the support documentation may be referenced directly at the monitoring station without interrupting the monitoring or control functions carried out by the processor.

It should be noted that the software summarized above with reference to FIG. 7 may include additional or other screens, links, representations, and functionalities. Moreover, the software may be designed to operate in conjunction with additional software for other purposes, and may be multi-tasked with other software, such as browsers, spreadsheet applications, text editing applications, and so forth.

Figure 8:
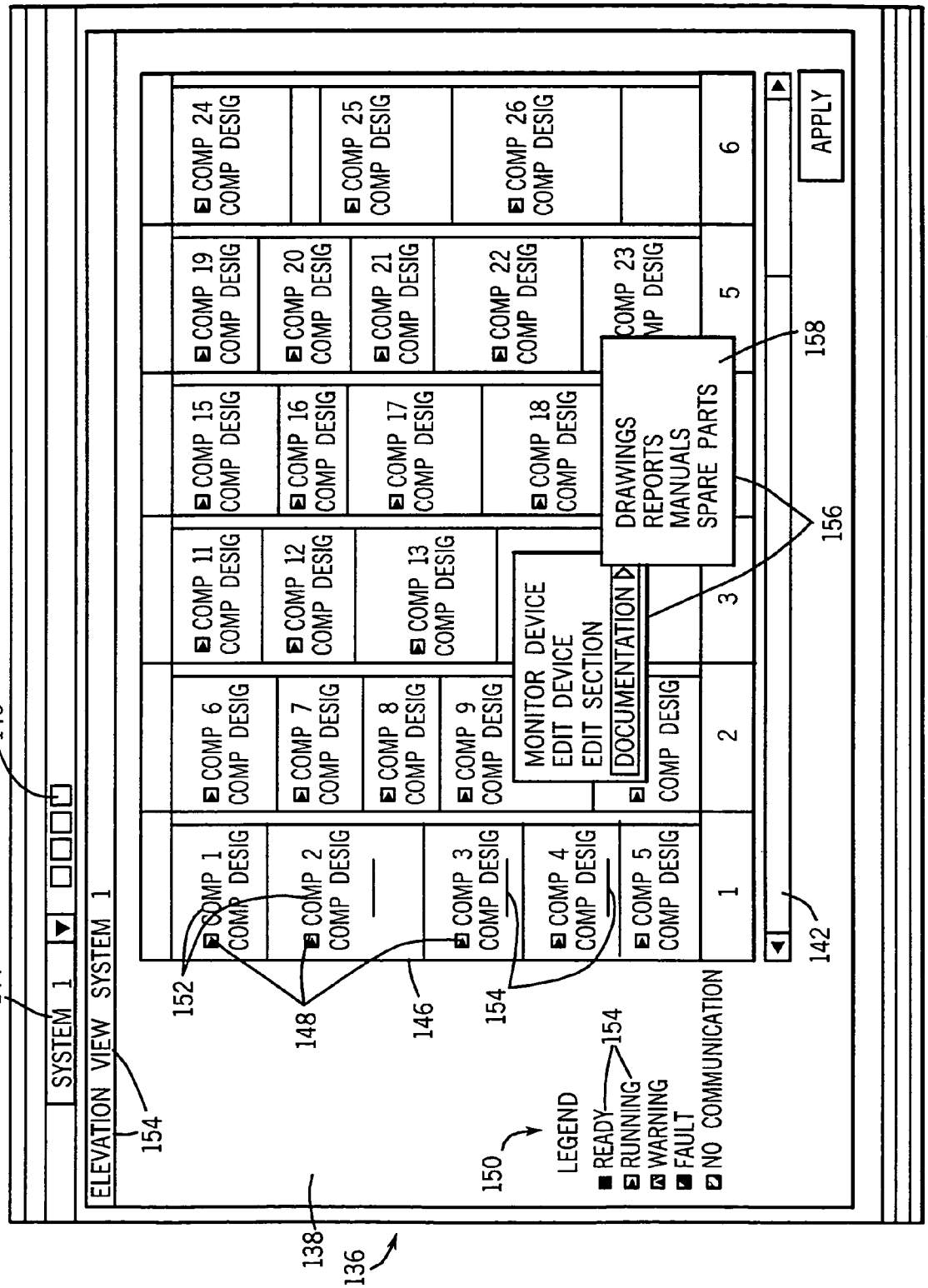
FIG. 8 is an elevational or physical layout view of a system of the type shown in FIG. 1 in an exemplary embodiment of software running on a monitoring station.

FIGS. 8-13 illustrate certain user viewable representations accessible on the monitoring station in accordance with the aspects of a present embodiment. As noted above, an extremely useful feature of the present system is the ability to build, in real time, an approximately accurate physical layout view or representation of the system and components based upon information stored within the dedicated memory objects of the components themselves. FIG. 8 represents a user viewable representation 136 which includes a page or screen 138 viewable on the monitor 68 (see FIG. 1) of the monitoring station. In the illustrated embodiment, the screen includes navigational bars or tools 140, such as virtual buttons which may be selected or actuated by an operator via an input device such as a conventional mouse. A scroll bar 142 is provided for moving between sections or portions of the system illustrated in the representation. A system label 144 designates which system is being viewed, and is based upon the system designation data stored within the memory objects of the components.

In the physical representation of FIG. 8, a depiction 146 is provided of the physical layout of the component assembly. In the illustrated embodiment, this depiction is approximately accurate in terms of the relative disposition of the components in the system, their coordinates in the system, and their relative sizes. The relative sizes and locations of the component representations in depiction 146 are based upon data stored within the memory objects of the components. In particular, as noted above, the memory objects of each component or translator include data indicative of the component locations, their sizes, and so forth. Based upon this data, the physical depiction 146 can be reconstructed, even without specific information or preprogramming of the depiction within the monitoring station. Moreover, each component representation in the depiction 146 preferably includes a status indicator 148 for identifying a current status of the respective component. A legend 150 provides the user with a translation of the meaning of each status indicator. Component textual labels 152 are provided for each component representation. The component textual labels are also based upon component data acquired from each component. Again, the component data is stored within the memory objects described above, and is used as a reference for extracting the component textual labels from the database.

It will be noted that the representations described herein, including the representation of FIG. 8, include a series of textual labels, such as for the components, their designations, legends, view identifications, and so forth. All such textual labels, designated generally by the reference numeral 154, are preferably stored as entries within database 96 (see FIG. 6) as described more fully below. Thus, in addition to the other functions of the monitoring station, the various representations available on the monitoring station may be viewed in one of a plurality of selectable languages by reference to specific textual labels stored within the database. Moreover, the representations include a series of links 156 which may be accessed by the user in various ways. For example, in a present embodiment, links may be accessed via navigational tools 140, or by selection of specific components in the depiction 146. In the embodiment illustrated in FIG. 8, such links may include monitoring representations, component data editing tools, system section editing tools, and documentation. As noted above, several types of documentation or support information may be accessed, such as via additional document links 158.

Figure 9:
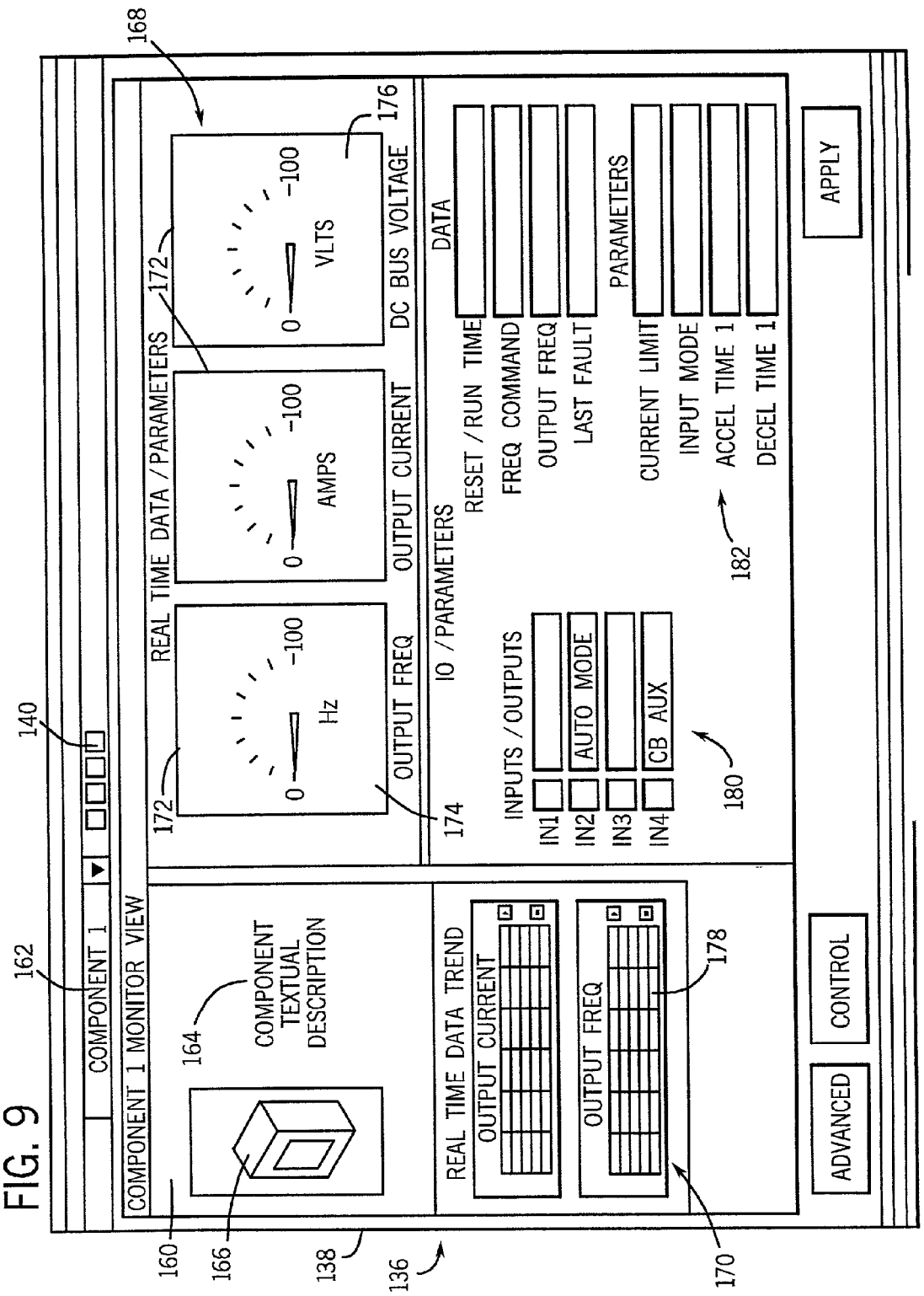
FIG. 9 is a device monitoring view accessible from the elevational view of FIG. 8 for certain of the programmable components.

FIG. 9 represents a monitor view for the components of the system accessible from the physical representation of FIG. 8. The monitor representation 160 includes series of features which inform the user of parameter status, component status, component settings, and so forth. In the illustrated embodiment, the monitor representation includes a component designation or label 162, derived from information stored within the memory object of a desired component selectable by the user. Based upon the component identification, the monitor representation 160 presents a textual component description 164 which includes basic information on the component and its operation. An image 166 of the component is provided to aid in visual recognition of the component in the event of needed servicing.

The monitor representation 160 of FIG. 9 also includes a range of parameter representations, indicating current levels of operating parameters, as indicated at reference numeral 168, and historical levels, as indicated at reference numeral 170. The specific parameters represented in the screen are preferably selected based upon the component identification, its operation and function in the system, and defaults stored for the component. In the illustrated embodiment, the current level indications include a series of virtual meters 172 which indicate levels of the default parameters, as indicated at reference numeral 174, or of operator selected parameters, as indicated at reference numeral 176. In the illustrated embodiment, the default parameters include output frequency, while a user selected parameter is bus voltage. Because many of the components of the system are capable of monitoring and controlling a wide range of parameters, key default parameters are selected in advance, depending upon the configuration and function of the respective components, while the operator may override the defaults and select the other parameters from pull down menus, or similar tools.

In addition to the indication of current parameter levels, the monitor representation 160 includes displays of historical parameter levels. The historical displays may take any convenient form, and in a present embodiment imitate conventional strip chart output as indicated at reference numeral 178 in FIG. 9. Again, the particular parameters traced in the strip chart output, or any other suitable historical presentation, may include default parameters for the particular component, or operator-selected parameters.

The monitor representation 160 may further include textual representations of various settings, configurations, and so forth, for the particular component. In the embodiment illustrated in FIG. 9, the component includes inputs and outputs, with appropriate interfacing circuitry within the component.

The configurations of the inputs and outputs are provided in the memory objects as discussed above. The monitoring station accesses this data and provides information on the inputs and outputs as indicated at reference numeral 180. Finally, the monitor representation illustrated in FIG. 9 includes textual or numerical indications of particular parameter levels, settings, times, frequencies, or any other suitable set points or level indications. As indicated by reference numeral 182, these may include both text and parameter levels, with appropriate textual labels for each.

The various views created and displayed in accordance with the present technique include a variety of textual descriptions and labels which may be displayed in various languages as desired by the user. In a present embodiment, the multilingual aspect of the representations is facilitated by the inclusion of language entries for each label, stored within database 96 (see FIG. 6). The user may select a language selection tool from a menu, such as a preference menu of the type illustrated in FIG. 10. Within the menu, a language tab allows the user to select the desired language, and the various language selections may be translated, themselves, into other languages for selection.

Figure 10:
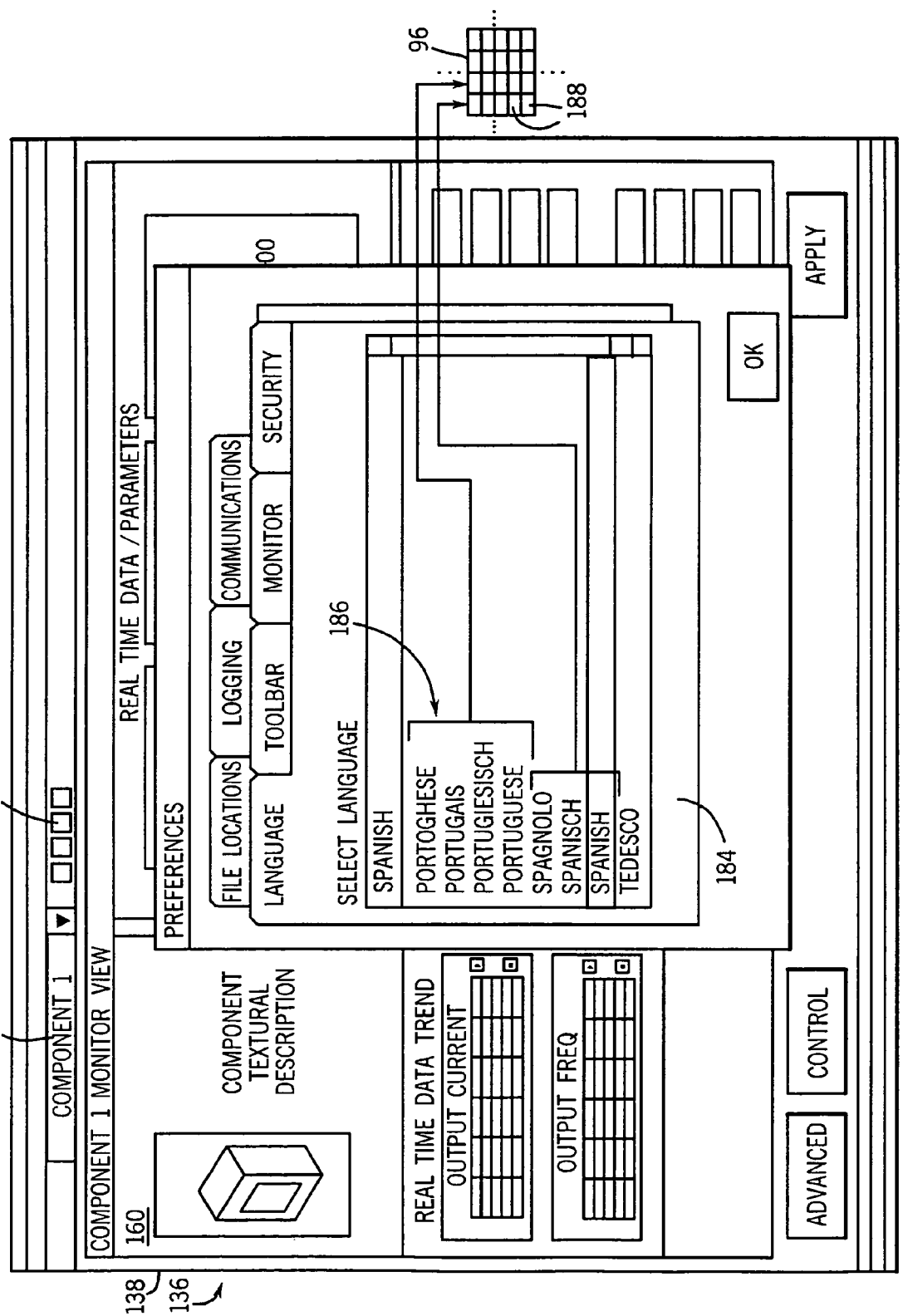
FIG. 10 is a view of one of the user viewable representations, such as that of FIG. 9, and illustrating the real time selection of a desired language for textual labels stored and accessible from the system database.

In the embodiment illustrated in FIG. 10, a user selects a desired language, such as Spanish, from a dropdown menu 184. The languages are displayed within the menu, and are selected via an input device, such as a conventional computer mouse. The list of languages, identified by reference numeral 186 in FIG. 10, allows for selection of any desired language for which textual translations are stored within database 96. Once a selection is made, the program automatically begins to draw all textual labels, descriptions, headings, and so forth from the appropriate entries 188 of the database 96.

The provision of the multilingual entries translated into the available languages in database 96 offers several distinct advantages. For example, the user may switch languages as desired during operation of the system, and without interrupting other functions of the system, such as real time monitoring and control. Moreover, the languages may be available for building real time views, including the physical view and the monitoring views at various locations accessible via a network interface as described above. A given system may thus be serviced remotely, such as by network connection to a different country or location. Furthermore, the provision of languages in translation as entries within the database permits the software to be provided in a single version and easily upgraded by simply allowing for access to a subsequent series of entries in the database, with corresponding options in the language menu.

In addition to the foregoing views, the present technique provides a spreadsheet-type representation or page which may be organized for each component, or for the entire system as illustrated in FIG. 11. In the representation of FIG. 11, the spreadsheet view 190 is referenced by system identification as indicated at reference numeral 144 based upon the information stored within the memory objects of the components of the system. Within the spreadsheet view, textual entries are provided including component designation data 192, also accessed from the individual memory objects of the components. In the embodiment illustrated in FIG. 11, the component designation data includes a device type, a node address, a vertical section and a unit location, the latter to parameters providing coordinate information for the identified component. Additional component designation data 194 may be viewable in the screen, including, in the illustrated embodiment, information stored within the components and indicative of a hardware, software or wiring configuration. In the illustrated embodiment the unit type, for example, may include textual information referenced from the database and corresponding to function data stored within the memory objects. By way of example, the text "FVNR" may be provided to represent a component which is configured as a full voltage, non-reversing motor starter. Additional such configuration data may include component rating, catalog numbers, and so forth. To facilitate manipulation of the data, and to permit user-selectable displays, a menu 196 may be provided in which a user may select to display or not to display specific system or component data by column.

Because the system provided herein is designed to cyclically poll the components for their state and specific operational parameters, events for the individual components or for the entire system may be logged. FIG. 12 illustrates an exemplary event log 200 stored for the system identified in the window 144 based upon the memory object data stored in the components. The event log may include a range of event types, such as specific faults or abnormal operating conditions, normal operating conditions or events, changes in component settings, and so forth. In the embodiment illustrated in FIG. 12, the event log includes component designation data 202, referencing each component by the device serial number, again based upon the information drawn from the device memory objects. An event time 204 is provided for each log event. Additional event data, as indicated generally by reference numeral 206 provides an indication of the type of event which occurred. Additional data may be stored within the system and accessed via the event log, such as to provide even further descriptive information on the nature of the log events.

Figure 13:
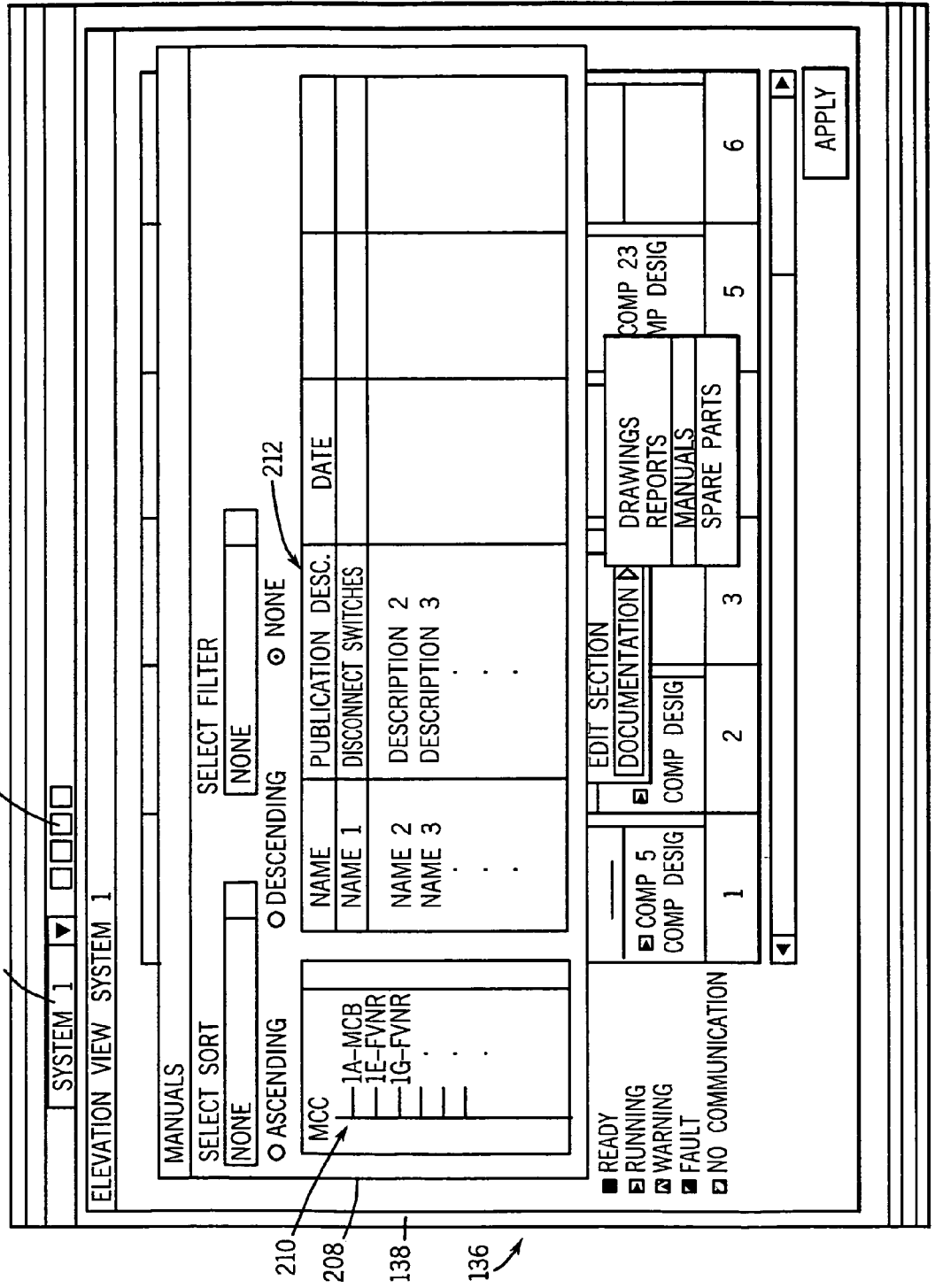
FIG. 13 is a view of support materials, such as manuals accessible from the menu illustrated in FIG. 12.

As noted above, the present system permits the real time monitoring, physical view construction, event logging, and so forth, with links directly to support documentation. FIG. 13 illustrates a series of windows accessed from the physical view of FIG. 8. As noted above, support documentation may be accessed in the system in any suitable manner, such as via dropdown menus which are accessible from the individual component representations in the physical view. Moreover, such selections may be available through virtual buttons or similar user actuatable features 140 in the various views. In the present embodiment, as shown in FIG. 13, a menu is displayed for the user upon selection of the documentation item from a menu, and specific additional menus may be provided for drawings, reports, manuals, and spare parts. The links to the support documentation are preferably based upon data stored within the various memory objects, particularly the device designation data. The document selection menu 208 is thus displayed, such as for manuals in the illustrated embodiment. Component designation data 210 appears for selection by the user. In the embodiment illustrated in FIG. 13, the component designation data includes an identification of the component location or coordinates, and the component configuration or function. Support documentation which is available for the component is indicated in an additional window 212. By selecting the links from this window, a user may access manuals for the specific components. As indicated above, the support documentation, including the drawings, reports, manuals, or spare parts lists are preferably stored in a memory medium useable directly in the monitoring station, such as a CD ROM disk or disk set, or in database 96. Certain of the documentation may be stored in systems or workstations external to the monitoring system, however, including in locations remote from the monitoring system and accessible via the data network, local area networks, wide area networks, and so forth. Upon selection of a specific document, the document is displayed, with the software calling the appropriate application for display of the document, including text editing programs, drawing programs, image display programs, and so forth.

Figure 14:
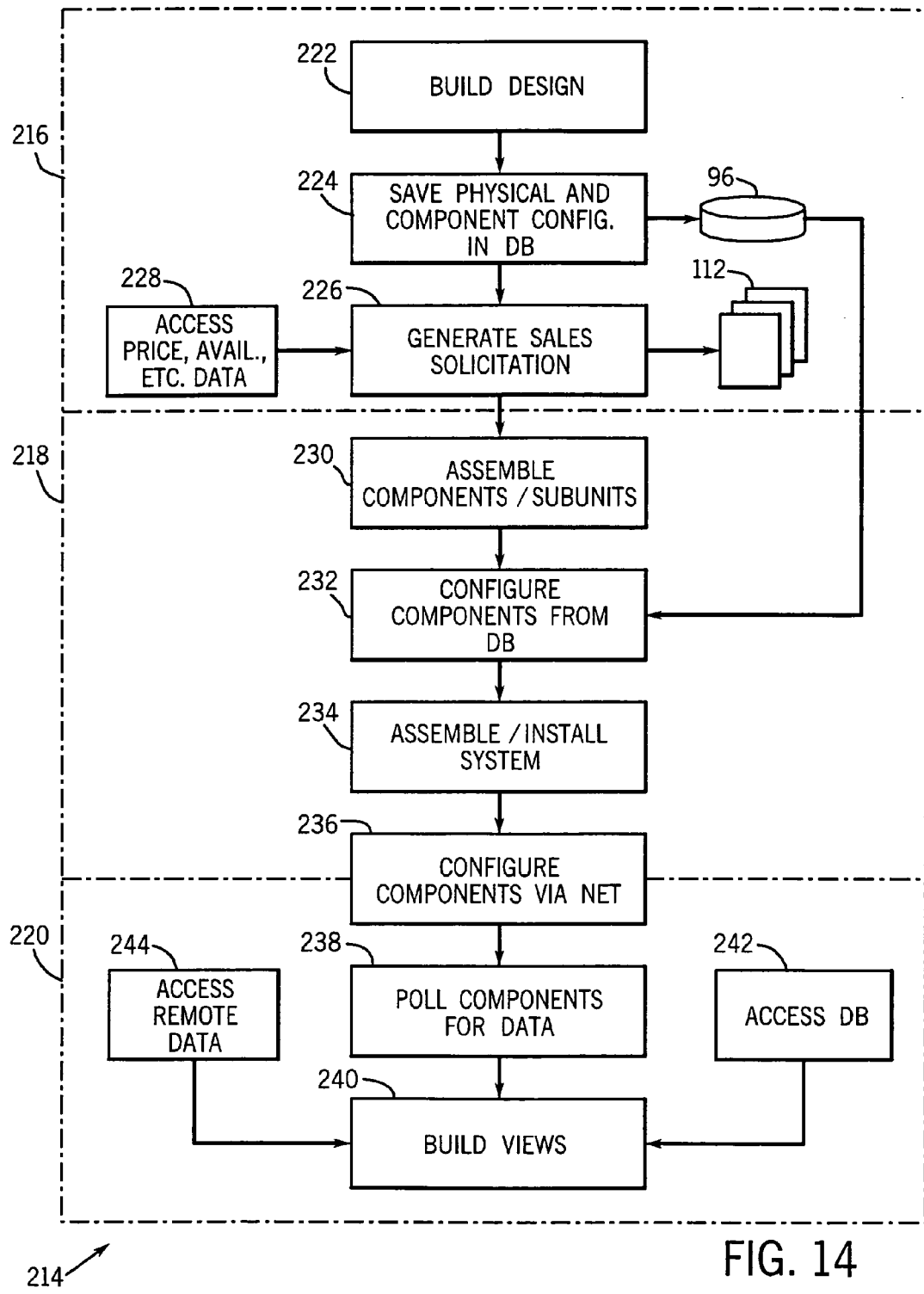
FIG. 14 is a flow chart illustrating exemplary logic in the design, assembly, programming, and operational phases of the system illustrated in the foregoing figures.

As noted above, the present technique permits an integrated system for designing, building, and utilizing electrical components in a programmable networked system, such as a motor control center. The technique includes, in the preferred embodiment, a database which is established during the design phase, and which is used as the basis for programming or configuring memory objects stored within the networked components and devices. FIG. 14 summarizes exemplary steps employed throughout this process.

As illustrated in FIG. 14, the process, designated generally by the reference numeral 214, includes several phases, including a design and sales phase 216, a manufacturing and configuration phase 218, and a utilization and monitoring phase 220. The first phase 216 begins with the design of the system as summarized at block 222. As noted above, system design may be based upon any suitable software application used for integrating the components into a cooperative system, and for generating any specifications required for verifying the operability of the design. At step 224, the physical and component configuration data is stored within a database. The database 96 is stored at this stage in the logic for use in soliciting sales of the system, and in the subsequent programming. As noted above, the database will serve as a platform for configuring the components, and will effectively be distributed among the components, at least in part, during the component configuration. At step 226 the design is used to generate sales proposal 112, which is also based upon the database. Step 226 may include incorporation of additional data external to the database, such as price information, deliver program (in general any suitable type of availability information), and so forth, for each component of the system. Step 226 produces a sales solicitation proposal 112, or similar document which may be used to establish the system specification, terms, and so forth.

Phase 218 in the process includes assembly of the components and subunits of the system, as indicated at step 230. The assembly may proceed by subunit or subassembly, such as in sections or "buckets" in certain types of system. Each subunit may therefore include one or more components which are mounted within the subunit and interconnected with wiring to permit their later incorporation into the system. At step 232 the components of each subunit are configured from database 96, such as by downloading database entries into the memory objects embedded within each component. At step 234 the components and subunits are assembled and installed in the system. In many applications, step 234 will include mounting of the actual components in system enclosure sets, along with any support connections and monitoring systems at a customer location. At step 236 the components may be further configured, such as via the data network described above. It should be noted that component configuration may occur at either step 232 or at step 236, or at both steps, depending upon the desired configuration data and the manner in which it is downloaded into the components. Thus, the configuration of the components may occur prior to assembly, during assembly, such as following partial assembly and subunits, or following system final assembly.

Phase 220, involving actual use of the system for monitoring and control purposes, may begin with step 236 in which the components are configured via the data network. Step 236 is also shown as at least partially included in phase 220 because, as summarized above, the memory objects may be designed for reprogramming or reconfiguring during use of the system. Such reconfiguration may be suitable where the component function is modified, inputs or outputs are added to specific components, a component location is changed, and so forth. The system may then function in accordance with a wide range of protocols and system architectures. In the summary of FIG. 14, components are cyclically polled for data as indicated at step 238. As noted above, this polling is done by the monitoring station to acquire component and system operation parameters as well as component designation data. At step 240 the various views discussed above are built by the monitoring station. The views may be built entirely from data accessed from the components, but are preferably also built based upon information accessed from the database as indicated at step 242. By way of example, the database may be used for providing specific language textual labels, component configuration data, settings, and so forth. The views may also incorporate data accessed remotely as indicated at step 244. Such remotely accessed data may include catalog information, drawings, trouble shooting information, or any other suitable data stored remote from the monitoring station and accessible via an appropriate network link.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A control and monitoring system including a plurality of control and monitoring components coupled to a monitoring station via a data network, the system comprising:
    a database including component data descriptive of the components and a plurality of language fields including textual labels for component data presentations translated into a plurality of languages; and
    a plurality of monitoring screens viewable on the monitoring station and including representations of component designations and component status parameters based upon monitored data collected by the monitoring station via the data network from the components in which identifying component data is stored, the screens including textual labels for the representations; wherein the monitoring station is configured to build a view of the components in real-time based upon the identifying component data and to access textual labels in a desired language from the database for display in the monitoring screens based upon the identifying component data collected from the components.

2. The system of claim 1, wherein at least one monitoring screen includes a user viewable menu for selecting the desired language.

3. The system of claim 2, wherein the monitoring station is configured to change textual labels in respective monitoring screen upon a change by a user of the desired language without otherwise altering the monitoring screen.

4. The system of claim 1, wherein the component data in the database includes component parameter settings.

5. The system of claim 1, wherein the component data in the database includes historical event data for the components.

6. The system of claim 1, wherein the component data in the database includes textual data descriptive of each component, and wherein the textual data is translated into the desired language for display.

7. The system of claim 1, wherein the component data in the database includes data representative of an image of each component.

8. The system of claim 1, wherein the monitoring station is configured automatically to poll the components for the component status parameters and to display the updated status parameter representations with currently selected desired language labels.

9. An industrial control and monitoring system comprising:
- a plurality of control and monitoring components configured to control or monitor application of electrical power to a load, and including at least data identifying the components stored in the respective components;
- a data network coupled to the components for accessing parameter and identity data from the components;
- a database including component data descriptive of the components; and a plurality of language fields including textual labels for component data presentations translated into a plurality of languages;
- a monitoring station coupled to the data network and configured to access the parameter data and the identifying data from the components; and
- a plurality of monitoring representations built in real-time based upon the identifying data and viewable on the monitoring station and including data about components and component status parameters based upon the parameter data, the representations including textual labels from the database in a desired language from the plurality of languages for display in the monitoring screens.

10. The system of claim 9, wherein the database is stored at the monitoring station.

11. The system of claim 9, wherein the monitoring representations include a user viewable menu of selectable languages.

12. The system of claim 11, wherein the monitoring station is configured to access the desired language for the textual labels from the database based upon a user selection made via the menu.

13. The system of claim 9, wherein the textual labels are displayed with component status parameters updated in real time.

14. The system of claim 13, wherein the desired language may be selectively changed by a user in real time without otherwise altering display of real time updated component status parameters.

15. The system of claim 9, wherein the components are configured to store component designation data and to transmit the designation data to the monitoring system upon demand by the monitoring system.

16. The system of claim 9, wherein the component data in the database includes component parameter settings.

17. The system of claim 9, wherein the component data in the database includes historical event data for the components.

18. The system of claim 9, wherein the component data in the database includes textual data descriptive of each component, and wherein the textual data is translated into the desired language for display.

19. The system of claim 9, wherein the component data in the database includes data representative of an image of each component.

20. A method for monitoring status of a system including a plurality of networked electrical components, the method comprising the steps of:
- accessing component status and identity data from a plurality of electrical components of a control and monitoring system via a data network, each component storing its respective identity data;
- accessing textual labels corresponding to the component status data from a system database, the database including translations of the textual labels in a plurality of languages and component descriptions for the components; and
- displaying a plurality of monitoring representations for the components, built in real-time based on the status and identity data, including presentations of component status data and textual labels in a desired language of the plurality of languages accessed from the database.

21. The method of claim 20, wherein the component status data is accessed by a monitoring station through periodic polling of the components by the monitoring station.

22. The method of claim 20, wherein the textual labels are accessed from the database in accordance with predetermined fields of the representations.

23. The method of claim 22, wherein the textual labels are accessed from the database in accordance with a user selection of the desired language.

24. The method of claim 23, wherein the representations include a user viewable menu for selecting the desired language.

25. The method of claim 24, wherein the desired language can be changed in real time by user selection via the menu.

26. The method of claim 20, wherein the component descriptions are displayed in the monitoring representations for the respective components.

27. The method of claim 26, wherein the component descriptions are stored in the database in the plurality of languages.

28. The method of claim 27, wherein the component descriptions are displayed in the monitoring representations in the desired language.

* * * * *